March 13, 1934.    J. B. GLOWACKI    1,950,489
CARTRIDGE FUSE, KNIFE BLADE TYPE
Filed Oct. 3, 1927    6 Sheets-Sheet 1
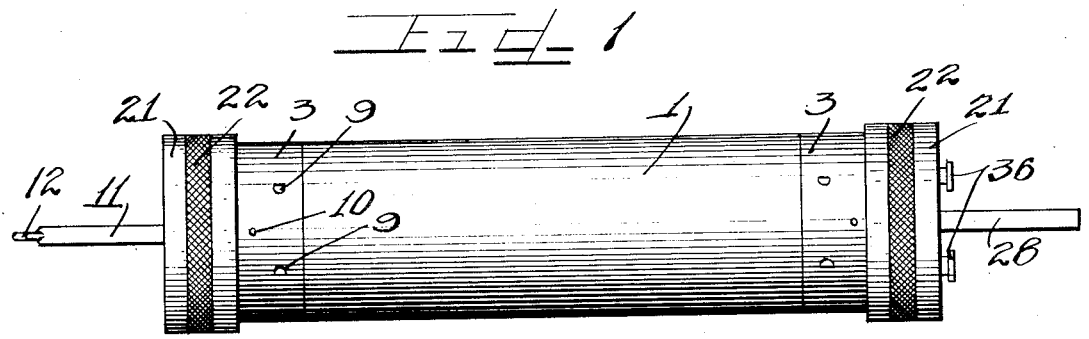
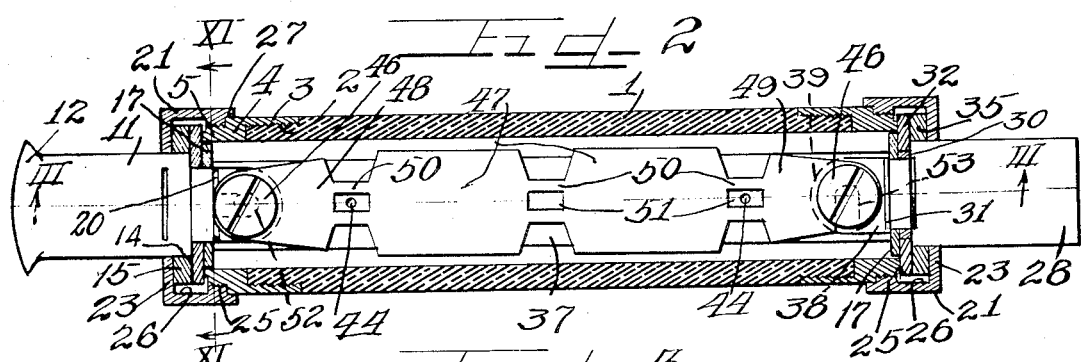
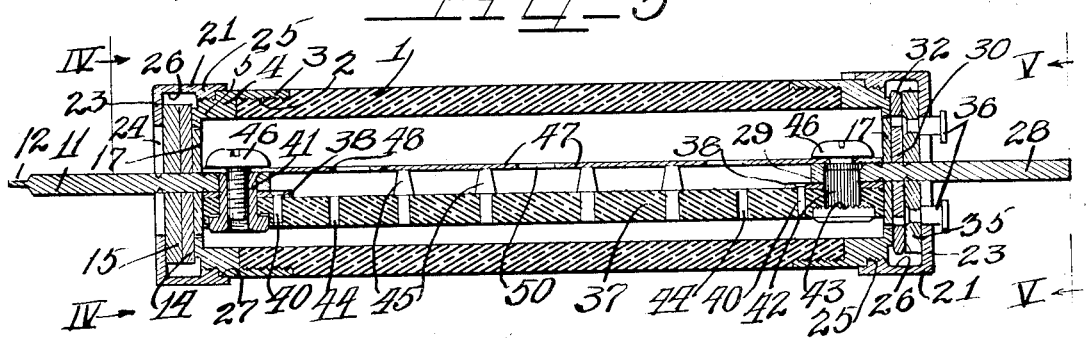
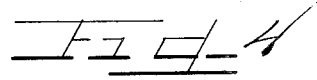
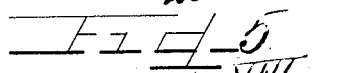
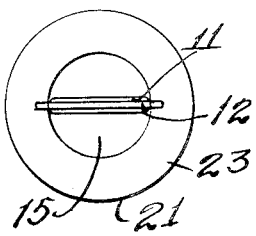
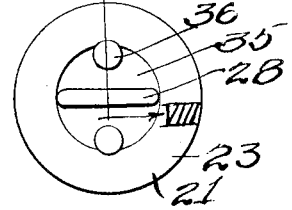
Inventor
John B. Glowacki
by Charles Hill
Attys March 13, 1934.  J. B. GLOWACKI  1,950,489
CARTRIDGE FUSE, KNIFE BLADE TYPE
Filed Oct. 3, 1927  6 Sheets-Sheet 2
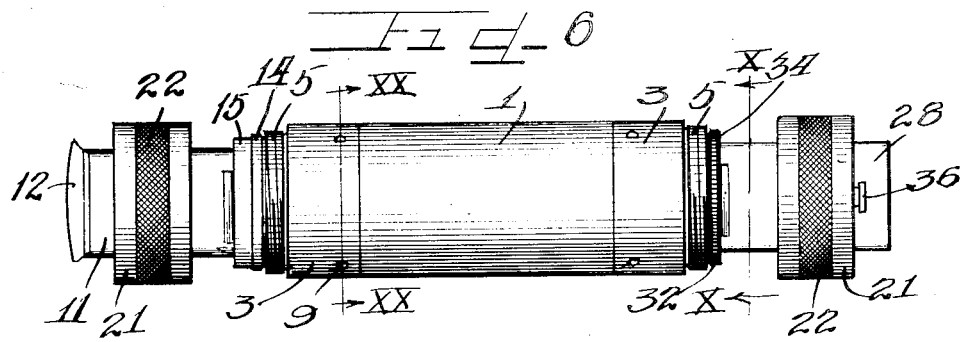
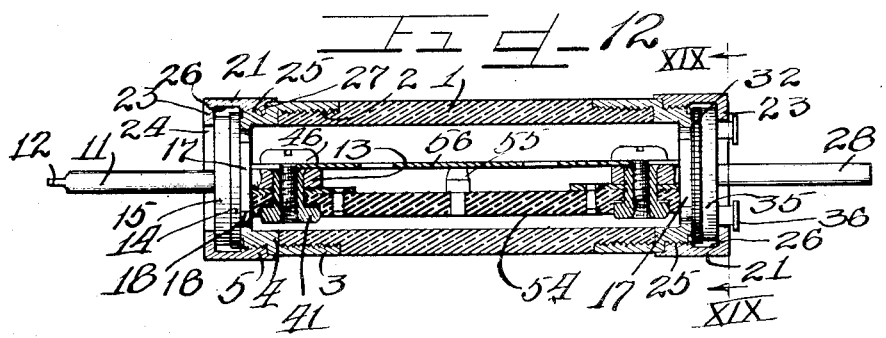
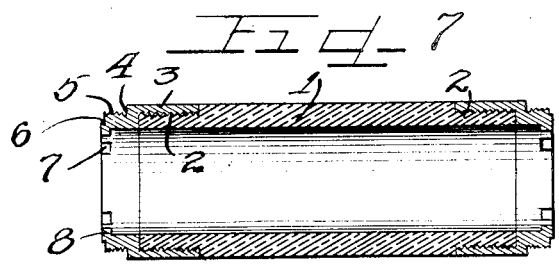
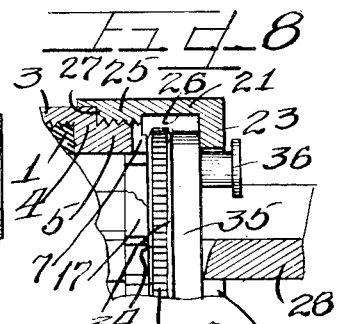
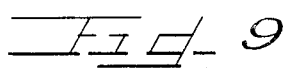
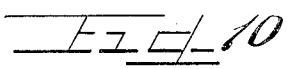
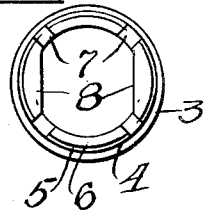
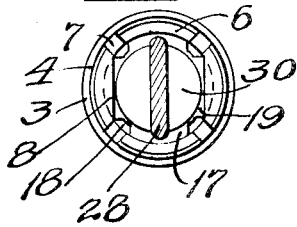
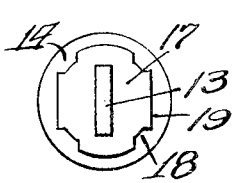
Inventor
John B. Glowacki
by Charles W. Hill
Attys.

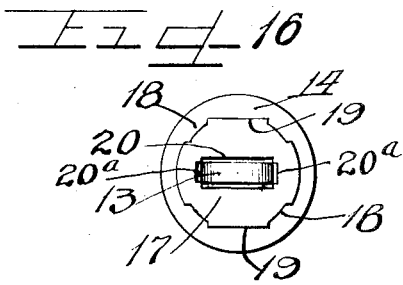
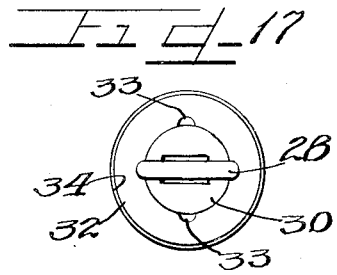
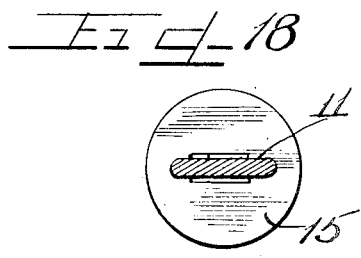
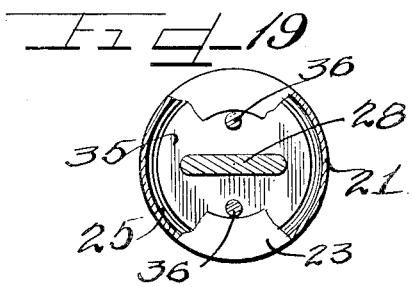
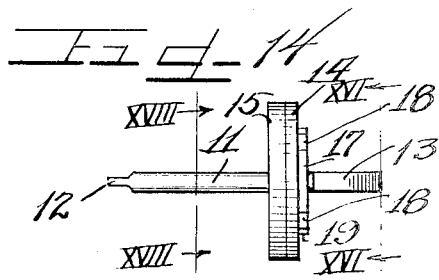
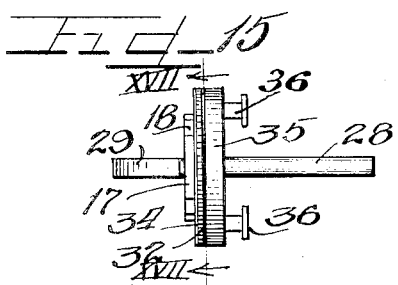
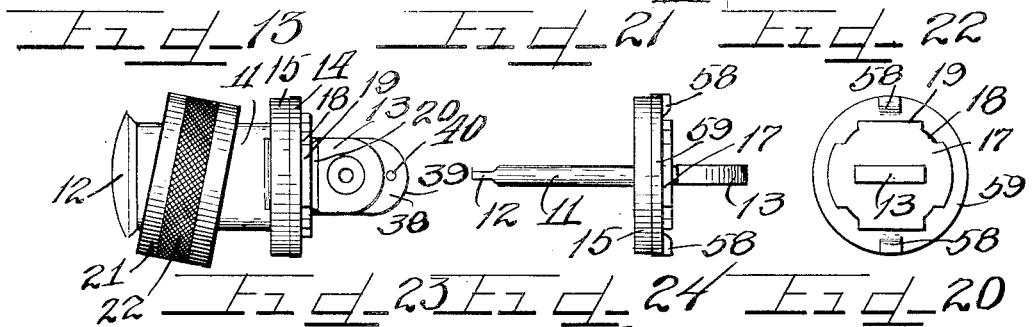
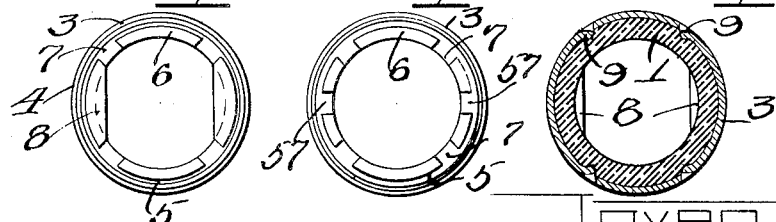

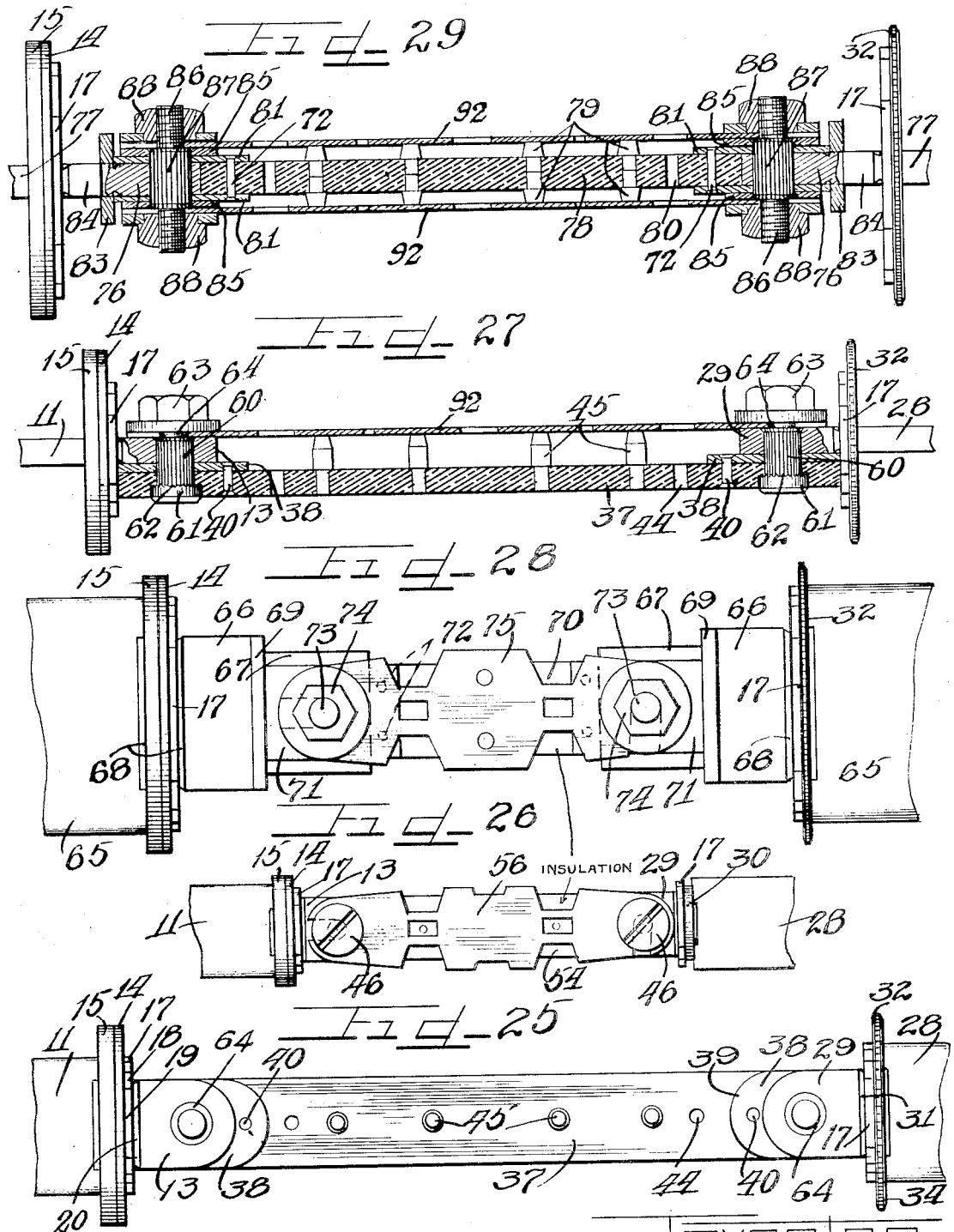

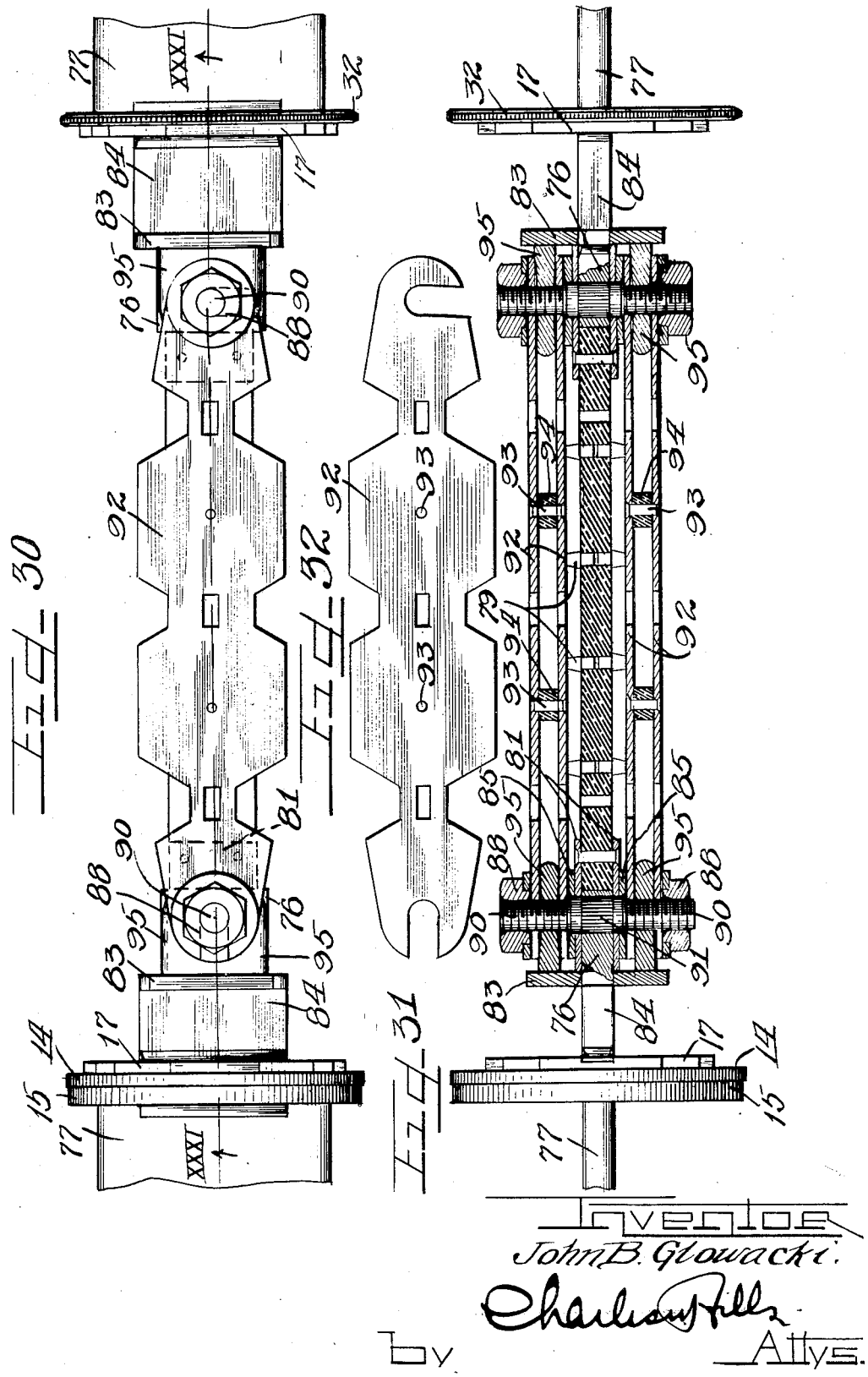

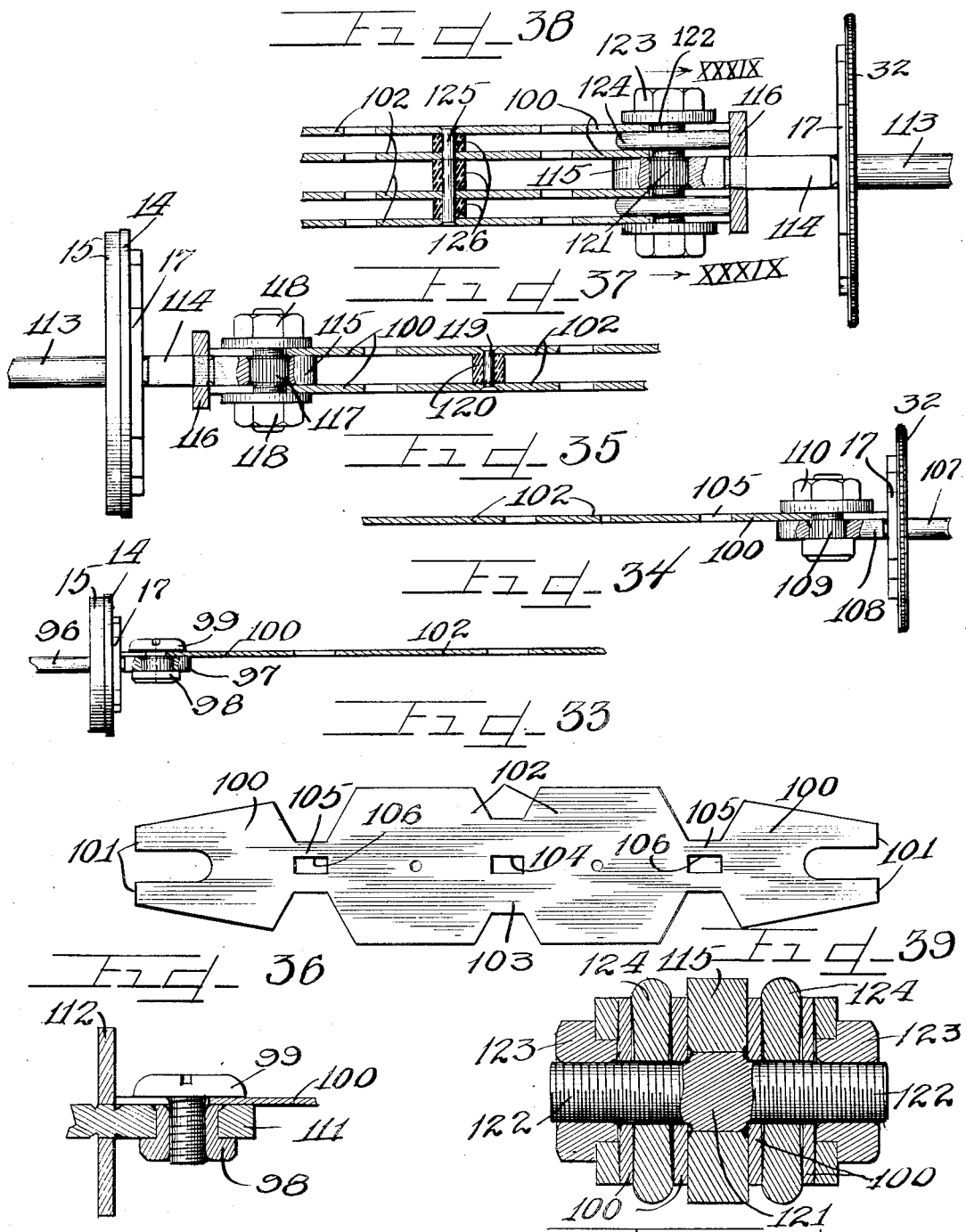

Patented Mar. 13, 1934

1,950,489

UNITED STATES PATENT OFFICE 1,950,489

CARTRIDGE FUSE, KNIFE BLADE TYPE

John B. Glowacki, Chicago, Ill.

Application October 3, 1927, Serial No. 223,615

42 Claims. (Cl. 200—131)

This invention relates to an improved cartridge fuse of the knife blade type adapted for renewable fuse elements, said fuse having the knife blade terminal units of improved construction whereby individual or multiple type fuse elements may be conveniently mounted in proper alignment with said terminal units to afford a fuse element assembly which may be inserted axially within a casing against rotation and removably locked by means of a locking disk and improved end caps.

It is an object of this invention to provide a knife blade type cartridge fuse wherein the fuse element and the terminals therefor may be inserted in a casing and removably locked therein in proper alignment against rotation.

It is also an object of this invention to provide a knife blade type cartridge fuse wherein the knife blade terminal units are so constructed that a standard capacity fuse element may be assembled either singly or in multiple to provide different capacities.

It is a further object of this invention to provide a cartridge fuse of the knife blade type wherein the knife blade terminals are constructed with stop plate members adapted to be separated by a predetermined distance to afford an arrangement whereby standard fuse elements may be mounted singly or in multiple to provide fuses of different capacities.

It is furthermore an object of this invention to provide a cartridge fuse of the knife blade type wherein the knife blade terminal units are provided with stop plates so that fuse elements may be mounted singly or in group units in positive proper alignment.

Still another object of this invention is to provide a cartridge fuse of the knife blade type wherein a standard fuse element of a standard capacity in length may be mounted in positive alignment individually, in unit pairs, or in unit multiple groups to provide fuses of different capacities, by providing stop plates at different distances from the terminal mounting disks to take care of different capacities.

A further object of this invention is to provide a cartridge fuse of the knife blade type wherein the casing thimbles are constructed to receive an element carrying terminal unit in a predetermined aligned position to permit a locking ring to be removably engaged thereon to lock the terminal unit in place.

Another object of this invention is to provide a cartridge fuse of the knife blade type wherein the casing thimbles are constructed with parallel flanges to receive the parallel sides of notched aligning disks carried by a fuse element terminal unit to hold said unit in predetermined proper alignment within the casing against rotation to receive a removable locking ring and removable end locking caps to complete the assembled fuse.

It is still another object of this invention to provide a cartridge fuse of the knife blade type wherein the casing thimbles are constructed to receive an element carrying terminal unit locked in a predetermined aligned position, with said thimbles provided with exterior threads equal in number to the threads provided in removable end locking caps, the interiors of which are peripherally grooved to afford a peripheral chamber within said caps to permit settling of dust particles, blown metal, and the like resulting from the blowing of a fuse within said chamber to prevent settling of said products between the threads of the thimbles and caps to prevent removal of said caps.

It is an important object of this invention to provide a cartridge fuse of the knife blade type wherein the knife blade terminal units are so constructed that self aligning fuse elements may be mounted singly, in pairs, or in multiple groups and removably retained in position by screw or nut mechanisms to provide an assembled terminal element carrying unit adapted to be removably inserted in a casing having thimbles constructed to receive a terminal unit in predetermined aligned position against rotation to receive a locking ring and end closure caps which complete the renewable fuse element knife blade cartridge fuse.

Other and further important objects of this invention will be apparent from the disclosures in the specification and the accompanying drawings.

This invention (in a preferred form) is illustrated in the drawings and hereinafter more fully described.

On the drawings:

Figure 1 is an elevational view of an improved cartridge fuse of the knife blade type embodying the principles of this invention.

Figure 2 is a longitudinal section of the cartridge fuse showing the fuse carrying terminal unit in elevation.

Figure 3 is a longitudinal section of the cartridge fuse taken on line III—III of Figure 2 with parts shown in elevation.

Figure 4 is an end view of the cartridge fuse taken on line IV—IV of Figure 3 with the terminal blade in elevation.

Figure 5 is an end elevation of the opposite end of the cartridge fuse taken on line V—V of Figure 3 also showing the terminal blade in elevation.

Figure 6 is a reduced elevational view of the knife blade type cartridge fuse with the end caps removed from engagement with the casing thimbles.

Figure 7 is a longitudinal section of the fuse casing and the thimbles forming a part thereof.

Figure 8 is an enlarged fragmentary detail section taken on line VIII—VIII of Figure 5 to illustrate the escape passages leading from the interior of the casing into the cap chambers.

Figure 9 is an outer end elevation of a casing thimble.

Figure 10 is an outer end elevation of a casing thimble taken on line X—X of Figure 6 with the knurled locking ring removed to illustrate the construction of the peripherally notched thimble closure disks which hold the assembled fuse element terminal unit against rotation within the fuse casing.

Figure 11 is a detail sectional view taken on line XI—XI of Figure 2 with the thimble and cap omitted.

Figure 12 is a longitudinal section with parts in elevation taken through a cartridge knife blade type fuse adapted to carry a renewable single fuse element of a capacity smaller than that illustrated in Figures 2 and 3.

Figure 13 is a side elevation of one of the knife blade terminal units removed from the fuse and illustrating the swaged end of the terminal blade provided for preventing removal of the end cap.

Figure 14 is a side elevation of the knife blade terminal unit illustrated in Figure 13 with the end cap and spacer plate omitted.

Figure 15 is a side elevation of the knife blade terminal unit for the opposite end of the cartridge fuse with the cap omitted.

Figure 16 is an inner end elevation of the left hand end terminal unit taken on line XVI—XVI of Figure 14.

Figure 17 is a view of the right hand end terminal unit taken on line XVII—XVII of Figure 15 with the terminal blade in elevation.

Figure 18 is an outer end elevation of the left hand end terminal unit taken on line XVIII—XVIII of Figure 14.

Figure 19 is a fragmentary sectional view of the right hand end terminal unit taken on line XIX—XIX of Figure 12 with parts of the cap broken away.

Figure 20 is a transverse section taken on line XX—XX of Figure 6 illustrating an improved method whereby a threaded thimble may be rigidly locked to the fibre body by means of a plurality of pairs of inwardly directed indented lugs.

Figure 21 illustrates a side elevation of a modified form of a fuse terminal unit provided with centering lugs.

Figure 22 is an inner end elevation of the terminal unit illustrated in Figure 21.

Figure 23 is an outer end elevation of the right hand end thimble for a modified form of fuse casing.

Figure 24 is an outer end view of the left hand end thimble for the modified form of fuse with said thimble provided with centering notches adapted to receive the centering lugs of the terminal unit illustrated in Figure 21.

Figure 25 is a fragmentary elevational view of the fuse terminal unit illustrated in Figure 27 removed from the fuse casing and with the fuse element and fuse element retaining nuts omitted.

Figure 26 illustrates a fragmentary elevation of a fuse terminal unit removed from its fuse casing and carrying a self aligning fuse element of a reduced capacity.

Figure 27 is a fragmentary longitudinal sectional view of a fuse terminal unit removed from its casing and illustrating improved bolt and nut type retaining means for renewable fuse elements.

Figure 28 is a fragmentary elevational view of a fuse terminal unit adapted to carry self aligning fuse elements of lower capacity from that illustrated in Figure 29 and provided with additional stop plates mounted on the inner ends of the terminal knives to facilitate alignment of the terminal knife units with the insulating bar connecting the same.

Figure 29 is a fragmentary longitudinal sectional view of a fuse terminal unit removed from its casing and illustrating double screw mounting units for mounting the connecting insulating bar with the terminal knife units and, furthermore, permitting the mounting of a pair of self aligning fuse elements on opposite sides of the insulating bar.

Figure 30 illustrates a fragmentary elevation of a high capacity terminal unit removed from its casing and adapted to carry a connected pair of high capacity fuse elements on each side of an insulating bar.

Figure 31 is a longitudinal sectional view taken on line XXXI—XXXI of Figure 30 with parts in elevation.

Figure 32 is a plan view of a removed self aligning fuse element of the type illustrated in Figures 30 and 31.

Figure 33 is a plan view of a double ended forked fuse element of the self aligning type adapted for use in connection with a modified form of cartridge fuse of the knife blade type wherein the terminal members are not connected by an insulating bar.

Figure 34 is a fragmentary sectional view of one end of a fuse element terminal unit removed from its fuse casing and illustrating a screw type retaining connection whereby the ends of a fuse element may be removably connected to connect the terminals of the terminal unit.

Figure 35 is a fragmentary elevational view of an opposite terminal unit for the modified form of cartridge fuse illustrating a modified form of bolt and nut retaining mechanism for attaching the end of a self aligning fuse element to the inner end of a terminal blade.

Figure 36 is an enlarged fragmentary detail section of the screw type mounting for a fuse element illustrating the screw in elevation.

Figure 37 is a fragmentary sectional view of one end of a terminal unit removed from its casing and provided with a double screw mounting to permit a dual type fuse element of the self aligning type to be removably attached to the inner end of a terminal blade.

Figure 38 is a fragmentary sectional view of one end of a terminal unit removed from its casing and provided with a double ended mounting screw and spacers to permit a self aligning fuse element of the multiple type to be removably connected with the inner end of a terminal blade.

Figure 39 is an enlarged transverse detail section of the double screw fuse element mounting taken on line XXXIX—XXXIX of Figure 38.

As shown on the drawings:

The parts which are illustrated in different views and which are of identical construction, except for the matter of size, will be identified by the same reference numerals.

The improved cartridge fuse of the knife blade type may be constructed with connecting insulating bars or without. Figures 1 to 32, inclusive, cover assembly and detail parts of improved cartridge fuses of the knife blade type wherein the terminals are connected by means of aligned insulating bars. The reference numeral 1 indicates a cylindrical housing or casing constructed of fibre or other suitable material and having both ends thereof reduced in diameter and externally threaded at 2. Threaded on each end of the fibre casing 1 is the enlarged internally threaded collar 3 of a metal thimble provided with an offset shoulder 4 which integrally connects the large internally threaded collar 3 with an outer externally threaded collar 5 of reduced diameter. A ring 6 is integrally formed on the outer end of the thimble collar 5 and said ring is provided with a plurality of vents or notches 7 positioned equidistantly from one another around said ring. Integrally formed on opposite sides of the inner periphery of said ring 6 are a pair of parallel flanges 8. The thimbles are threaded tightly in position to seat on the ends of the fibre casing 1 with the thimble flanges at one end positioned opposite and parallel with the flanges 8 of the thimble mounted on the opposite end of the casing 1. For the purpose of rigidly holding the thimbles locked in position upon the ends of the fibre casing 1 the casing with the end thimble mounted thereon is properly placed within a punch which will simultaneously punch two pairs of indents or locking teeth 9 inwardly to grip into the fibre casing 1 with the two indents or teeth of each pair directed in opposite directions, as clearly illustrated in Figure 20, to hold the thimbles rigidly clamped on the casing 1 against removal. This indenting of the collars 3 of the thimbles with but a single operation permits of a substantial reduction in the cost of manufacture and obviates the use of a plurality of locking set screws or other similar devices which have heretofore been used. Simultaneously with the punching of the indents 9 the punch mechanism used is provided with means whereby a small aligning indent 10 is punched in the outer face of each thimble collar 3 with the indent 10 of one collar positively aligned with the indent 10 of the opposite thimble collar to provide guide indents for the convenient mounting of a fuse element carrying unit in proper alignment within the casing, as hereinafter more fully described.

Removably mounted within the casing 1 and projecting therefrom is a knife blade terminal unit comprising a copper knife blade terminal 11, the outer end of which is swaged to provide a large cap retaining head or rib 12. The inner end of the terminal blade 11 is of reduced width to form a tongue or projection 13 which is provided with an opening and has the end thereof rounded. By reducing the inner end of the knife blade 11 a shoulder is provided against which a slotted metal disk 15 is adapted to be engaged over the tongue 13 to seat against said shoulder to afford a stop for another metal disk 14 which is slotted to permit the same to be slidably engaged over the tongue 13. Engaged over the apertured knife blade tongue 13 and positioned against the inner face of the stop disk 14 is a metal thimble closure plate 17 provided with four notches 18 spaced equidistantly from one another around the periphery of said plate and adapted for registration with the vent notches 7 in the casing thimbles, as illustrated in Figure 10, when the fuse is assembled. The thimble closure plate 17 is provided with two opposite parallel straight edges 19, as clearly illustrated in Figure 16, with said straight edges also positioned parallel to the slot in the thimble closure plate so that the oppositely positioned straight edges 19 of the thimble closure plate are positively positioned parallel to the side faces of the tongue 13 of the terminal blade 11. To hold the stop plates 14 and 15, and the thimble closure disk or plate 17 rigidly secured upon the inner end of the terminal knife blade the opposite sides and edges of the knife blade extension or tongue 13 are staked at 20 and 20a.

Loosely engaged on the terminal knife blade 11 between the cap closure plate 15 and the swaged head 12 is a removable end closure cap 21 provided with a knurled peripheral band 22. The outer end of the cap is provided with an inwardly directed flange 23 providing an opening at 24 of a diameter slightly greater than the width of the knife blade terminal 11 to permit said terminal to project through the cap. Integrally formed peripherally within the cap 21 near the inner open end thereof is a threaded flange 25 which provides an inner peripheral groove 26 within the cap between the threaded flange 25 and the outer flange 23, as clearly illustrated in Figures 2 and 3. The threaded flange 25 within the cap is spaced a short distance from the inner end thereof to provide a peripheral seat or groove 27 adapted to seat against the shoulder 4 of the left hand end thimble of the casing 1 when the cap is threaded in position onto the externally threaded collar 5 of the thimble. When the left hand closure cap 21 is threaded into position on the left hand thimble of the fuse casing, as illustrated in Figures 2 and 3, it will be noted that the inner cap groove 26 affords a chamber between the periphery of the plates 14 and 15 and the inner peripheral surface of the cap. This peripheral chamber is provided for the purpose of permitting dust and metal articles resulting from the blowing of a fuse element within the casing 1 to blow out through the thimble closure plate notches 18, the outlet vents 7 in the thimble ring 6, into the chamber 26, and to settle on the walls of said chamber before they have a chance to clog up the spiral passage between the threaded thimble collar 5 and the threaded internal flange 25 of the closure cap. It will thus be seen that the danger of clogging up or soldering the threaded portions of the thimble and cap is obviated.

As illustrated in Figure 13, it will be seen that the left end cap 21 is loosely associated with the knife blade terminal 11 and is prevented from falling therefrom by means of the swaged head 12, thereby providing a complete left end terminal unit for the improved knife blade cartridge fuse. As clearly illustrated in Figures 1 to 3, inclusive, the improved cartridge fuse of the knife blade type is also provided with a right end terminal unit when considering a fuse positioned as illustrated in Figure 1, and said right hand terminal unit comprises a copper knife terminal blade 28, the inner end of which is reduced in width to form a tongue or extension 29, the outer end of which is rounded. The tongue 29 is also provided with an opening near the rounded end thereof. The reduced apertured tongue 29 where it connects up with the inner end of the knife blade terminal 28 provides a shoulder against which a slotted disk 30 is seated, with said disk being of a diameter slightly less than the width of the terminal blade 28. Mounted on the terminal blade tongue 29 adjacent the inner face of the small disk 30 is another thimble closure plate or disk 17 provided with notches 18 and straight parallel side edges 19 similar to the closure plate 17 illustrated in Figure 16. To rigidly hold the small disk 30 and the notched thimble closure plate 17 secured on the knife blade terminal tongue 29 said tongue 29 is staked at 31. Adapted to be rotatably engaged on the small disk 30 is a metal lock ring 32 provided with a pair of diagonally opposite notches 33 in the inner peripheral margin of said ring to permit the lock ring 32 to be slidably engaged over the terminal blade 28 and engage around said disk 30 as illustrated in Figure 17, after which the lock ring 32 is rotated approximately a quarter of a turn to move the notches 33 out of register with the longitudinal edges of the terminal blade 28, thereby locking the ring between the shoulder at the inner end of the terminal blade 28 and the thimble closure plate 17, as illustrated in Figure 15. To facilitate mounting and removing of the lock ring 32, said ring has the peripheral edge thereof knurled. Both of the outer peripheral edges of the locking ring 32 are cut away to afford grooves 34.

Removably engaged on the terminal blade 28 is another right hand end cap 21 constructed the same as the left hand end cap. Loosely mounted in the groove 26 of the right hand end cap is a transversely slotted cap closure plate or disk 35 having riveted to the outer face thereof two headed rivets or pins 36 which project through the opening in the outer end of the cap with the heads of said pins positioned to the outside of the cap flange for the purpose of holding the cap closure plate 35 associated with the right hand cap. The right hand cap 21 is adapted to be slidably engaged on the terminal blade 28 and pushed inwardly until the threaded flange 25 meets the threaded collar 5 of the right hand thimble, permitting the cap to be screwed on said thimble with the cap closure plate tightly compressed between the knurled locking ring 32 and the flange 23 of said cap.

With the two terminal units hereinbefore described means have been provided for rigidly connecting the same in predetermined aligned position by means of a fibre connecting bar 37. The fibre connecting bar 37 is positioned to one side of the tongues 13 and 29 of the terminal blades 11 and 28, respectively, and is separated from said terminal tongues by means of metal spacer plates 38, the inner ends of which are rounded as at 39 (Figure 13) while the outer end is squared to lie adjacent and parallel to the squared end of the connecting bar. Each spacer plate is rigidly secured to the fibre connecting bar 37 by means of a rivet 40. Rigidly riveting each end of the fibre bar and the spacer plate 38 thereon to the apertured tongue of a terminal blade is a headed hollow internally threaded bushing or sleeve 41, the outer cylindrical surface of which is longitudinally knurled, as indicated by the reference numeral 42, (Figure 3) while the inner end of the bushing head is knurled at 43. The knurled surfaces provided on the exterior of the bushing 41 are provided to permit the bushing to be tightly driven through a counter sunk opening in the end of a fibre connecting bar and through the apertured openings in the spacer 38 and the tongue of a terminal blade to rigidly hold said parts riveted together with the knurled head of the bushing seated in the outer face of the fibre connecting bar while the inner end of the bushing is upset to fill a counter sunk opening in the tongues of the respective terminals 13 and 29. With the fibre connecting bar rigidly riveted by means of the hollow threaded bushings 41 to the tongues of the terminal units the squared ends of the spacers 38 and the fibre connecting bar abut squarely against the end thimble closure plates 17 so that the connecting bar and the terminal blades 11 and 28 are correctly and rigidly aligned with one another. The fibre connecting bar 37 is provided with a plurality of apertures 44 and with a plurality of aligned spaced insulation bridge pins 45. Adjustably threaded into the upset end of each of the bushings 41 is a retaining screw 46.

It will thus be noted that the fibre connecting bar, together with the screws 46 and the end knife blade terminal units, one of which loosely carries the cap 21, forms a removable fuse element carrying unit adapted to have removably mounted thereon a renewable fuse element comprising a pair of intermediate sections 47 and outwardly tapered end sections 48 and 49 (Figure 2). The intermediate sections and the tapered end sections are integrally connected by reduced fusing sections 50 each of which is provided with a rectangular oblong opening 51, with said openings longitudinally aligned centrally of the fuse element. The outer rounded end of the fuse element end section 48 is provided with a central longitudinal end slot 52 while the tapered fuse element end section 49 is provided with a transverse notch 53 forming said end section into a hook member. To mount the renewable fuse element in position on the removable terminal unit the forked end section 48 of the fuse element is engaged beneath the head of the screw 46 associated with the terminal blade tongue 13 and the entire element is then pivoted about said screw to permit the hooked end section 49 of the fuse element to swing into engagement with the screw on the terminal blade tongue 29 with the notch 53 engaging over the screw shank to seat thereon to positively hold the renewable fuse element properly aligned with the terminal blades 11 and 28, after which the screws 46 are tightened to hold the parts assembled. With the renewable fuse element mounted in self aligning position as described, the intermediate sections 47 of the fuse element are adapted to rest upon the insulation bridge pins 45, as illustrated in Figure 3, so that in case the fuse element should become overheated it will not sag into contact with the fibre connecting bar 37 to burn the same when the fuse is blown.

The removable terminal unit carrying the aligned fuse element may be easily mounted in position within the casing 1 by projecting the terminal blade end 28 of the unit through the thimble and one end of the casing 1 with the terminal blades 11 and 28 aligned with the guide indents (Figure 1) until the thimble closure plates 17 seat in the flanged ring 6 of the thimbles with the straight edges 19 of the thimble closure plates registering with the straight edges or flanges 8 of the thimbles. The thimble closure plates are thus seated in position in the ends of the thimbles with the small disk 30 projecting beyond the end of the right hand thimble, after which the locking ring 32 is slidably engaged over the terminal blade 28 over the small disk 30 and in contact with the outer end of the right hand thimble. The locking disk 32 is then rotated approximately a quarter of a turn so that the notches 33 in the locking plate are moved out of register with the longitudinal edges of the terminal blade 28 to hold the fuse element terminal unit locked in proper aligned position within the fuse casing 1. The left hand end cap 21 is now threaded on the left hand thimble until the cap groove 27 seats on the shoulder 4 of the thimble while the cap flange 23 rigidly clamps against the cap closure plate 15 to still further lock the terminal unit within the casing. The removable cap 21, together with its closure plate 35, is now slidably engaged over the terminal blade 28 and said cap is screwed on the externally threaded end 5 of the right hand thimble so that the cap closure plate 35 is tightly clamped against the lock ring 32 to complete the assembly of the knife blade type cartridge fuse.

When a cartridge fuse of the knife blade type is mounted in position for use and is subjected to an abnormal current or is shorted, the fuse element will blow at the reduced longitudinally slotted fusing sections 50 with the bridge pins 45 preventing the intermediate sections of the fuse element from dropping into contact with the fibre connecting bar 37. The gases and other products resulting from the blowing of the fuse, such as dust and particles of metal, are permitted to escape from the interior of the fuse casing through the notches 18 in the thimble end closure plates 17 and through the outlet vents 7 in the thimbles, permitting the escaping products to circulate in the cap chamber 26 so that the dust and metal particles finding their way into said chambers are permitted to be cooled in said chambers before they have a chance to escape between the coacting threads of the threaded internal cap flanges 25 and the externally threaded collars 5 of the thimbles. Clogging and soldering of the threaded portions between the thimbles and caps is thus obviated, permitting the fuse caps to be readily removed after the blowing of the fuse, after which the locking caps 21 and the lock ring 32 are released and the entire terminal unit together with the parts of the blown fuse element removed from the casing. The parts of the blown fuse element may now be conveniently removed by simply releasing the retaining screws 46. The slotted tapered end sections of the fuse element may be easily removed for the reason that the peculiar shape of said end elements having the inner ends thereof enlarged where they integrally connect up with the fusing sections 50 causes a positive blowing of the fuse at the points where the reduced fuse sections join the enlarged sections of the fuse elements. The enlarged inner ends of the end sections permit said ends to cool more rapidly thereby obviating any danger of the fusing extending outwardly to the slotted end portions of the fuse element to the points where they are engaged by the retaining screws and where they come in contact with the tongues of the terminal plates. By preventing the spreading of the fusing there is no danger of the fuse elements becoming soldered to the terminal tongues and convenient removal of the fuse element parts is thus greatly facilitated.

Figure 12 illustrates a cartridge fuse of the knife blade type of a smaller capacity than that illustrated in Figures 1 to 3, inclusive. In this case the parts are constructed similar to the parts described and illustrated in Figures 1 to 3, with the exception that the fibre connecting bar 37 is replaced by a shorter fibre connecting bar 54 which is provided with an insulation bridge pin 55 against which the middle section of a renewable fuse element 56 is adapted to contact. The end sections of the renewable fuse element 56 are constructed similar to the end sections 48 and 49 of the renewable fuse element illustrated in Figure 2.

Referring now to Figures 21 to 24, inclusive, Figure 23 illustrates an outer end view of a casing and right hand end thimble constructed identical to the construction of the thimbles illustrated in Figure 9. The left hand end thimble of this modified form is constructed similar to the right hand end thimble shown in Figure 23, with the exception that a pair of additional oppositely disposed notches 57 are provided in the ring 6. In this form of thimble the flanges 8 are omitted leaving a round opening in the end of the thimble. These notches 57 are provided to receive a pair of diametrically opposite lugs 58 which are struck from a disk 59 secured on a terminal blade 11 between a closure cap disk 15 and a notched thimble closure plate 17 similar to the parts hereinbefore described. The lugs 58 struck from the plate 59 carried by the terminal blade end units are permitted to be seated in the notches 57 of the thimble illustrated in Figure 24 to hold the terminal blade end unit properly aligned within a fuse casing.

Figure 26 illustrates a fragmentary portion of the removable terminal unit used in the small capacity cartridge fuse illustrated in Figure 12 and illustrates a plan view of the small capacity renewable fuse element 56.

Figure 27 illustrates a fragmentary sectional view of a terminal unit removed from its casing and constructed similar to the terminal unit illustrated in Figure 25. Like parts are accordingly designated by corresponding reference numerals. In the terminal unit of the type illustrated in Figure 27 a modified form of fuse element securing means is provided. This means consists of a bolt having an exteriorly knurled shank 60 and a head 61, the inner end of which is knurled at 62. Integrally formed on one end of the knurled shank 60 is a screw extension around which the notched end of a fuse element is adapted to be engaged and removably locked in place by means of a flanged nut 63. One of the retaining screws is forced through each end of the fibre connecting bar 37 through the spacer 38 and the terminal blade tongue with the knurled end of the head 61 seating in a recess provided for the purpose in the fibre bar. The knurled portions of the shank 60 and the head 61 serve to hold the bolt member locked against rotation. The opposite end of the bolt shank 60 is upset to seat in a counter sunk groove in the respective terminal plate tongue. It will thus be seen that the knurled portions of the mounting bolts serve to rigidly hold the terminal blades and the spacer plates connected to the respective ends of the fibre connecting bar, thereby completing the removal terminal unit. The renewable fuse element 92 hereinafter described in connection with Figure 32 is adapted to have the forked end thereof inserted on the screw portion 64 of one of the bolts, after which the fuse element is pivoted on said bolt to permit the hooked end of the fuse element to be swung into engagement with the screw 64 of the opposite bolt, thereby positioning the fuse element in proper aligned position with respect to its terminal unit. The flanged nuts 63 are then tightened to hold the fuse element in its aligned position with the middle sections of the fuse element seating against the bridge pins 45.

Figure 28 which illustrates a modified type of terminal unit consists of a left hand terminal unit comprising a terminal blade 65 having a reduced integral intermediate extension 66 formed on the inner end thereof and a reduced inner end section 67 which is integral with the inner end of the intermediate section 66. Mounted on the left hand terminal blade between the sections 65 and 66 and secured in place by means of the staking 68 are a pair of disks 15 and 14 and a closure plate 17 of the types hereinbefore described. Rigidly secured on the terminal blade inner end sections 67 and abutting against the inner end of the terminal plate intermediate section 66 is a stop plate 69 which is secured in place by staking or other suitable means. The right hand terminal blade unit is constructed the same as the left hand terminal blade unit with the exception that a thimble closure plate 17 and a locking ring 32 are mounted thereon between the terminal blade 65 and the intermediate terminal blade section 66. The inner end section 67 of the two terminal blade units are rigidly connected in alignment by a fibre connecting bar 70 having rectangular oblong metal spacer plates 71 rigidly secured on opposite sides thereof by means of rivets 72 with the outer ends of the spacer plates 71 squared and abutting against the stop plates 69. Knurled bolt units 73 similar to the bolt units illustrated in Figure 29 are provided for rigidly holding the terminal blade end units connected by means of the fibre connecting bar 70. Flanged nuts 74 are engaged on the threaded ends of the bolts 73 for the purpose of removably holding a renewable fuse element 75 in proper aligned position connecting the two end terminal blades. The renewable fuse element 75 is constructed similar to the fuse elements hereinbefore described. In this type of terminal unit the stop blocks 69 are provided to permit the squared ends of the spacer plates 71 thereon to abut said stop blocks to facilitate proper alignment of the parts. The provision of the stop blocks also permits a standard length of renewable fuse element to be used in pairs or in multiple to produce different capacity fuses.

Figure 29 illustrates another type of removable terminal unit wherein the reduced inner ends 76 of terminal blades 77 are rigidly connected in proper alignment by means of a fibre connecting bar 78 having a plurality of aligned insulating bridge pins 79 projecting from each side thereof and also having vents or passages 80 therein for the purpose of diffusing and spreading the flames when fuse elements blow. Riveted by means of rivets 72 to each end of the fibre connecting bar 78 and to opposite faces thereof are a pair of metal oblong spacers 81 the outer ends of which are squared and project beyond the end of the fibre connecting bar to seat against opposite faces of the inner terminal blade section 76 with the squared ends of said surfaces seated against a stop plate or block 83 staked in position between the inner terminal end section 76 and an intermediate terminal blade section 84. The squared spacer plates 81 abutting against the stop blocks 83 serve to properly align the connecting bar 78 with the terminal blades. Seated against the outer face of each of the spacers 81 is a washer 85. For the purpose of rigidly holding the washers 85 and the spacer plates 81 secured to an inner end terminal blade section 76 a double ended screw bolt 86 has the knurled shank 87 thereof driven through apertures in the washers 85, the spacers 81, and the respective terminal blade end sections 76 with the ends of the knurled shank upset to fill counter sunk portions of the washers 85. Adjustably threaded on the two projecting screw bolt ends 86 are flanged nuts 88. Removably engaged on each side of the terminal unit is a self aligning renewable fuse element designated as a whole by the reference numeral 92 having one end section forked and the other end section hooked similar to the fuse element illustrated in Figures 2 and 32. The renewable fuse elements 92 when engaged in aligned position on opposite sides of the fibre connecting bar 78 are adapted to be removably held in position by means of the flanged nuts 88 with the intermediate sections of the fuse elements seating against the insulating bridge pins 79.

Figures 30 to 32, inclusive, illustrate a large capacity type of knife blade cartridge fuse in which the terminal unit has the various parts constructed similar to the parts illustrated and described in Figure 29. Similar parts are, therefore, designated by corresponding reference numerals. In this type of terminal unit, however, screw bolt ends 90 are provided, which are considerably longer than the screw bolt end sections 86 and are connected by means of an intermediate knurled shank 91. This type of terminal unit is adapted for mounting renewable fuse elements 92 in pairs with the intermediate sections of the renewable fuse elements connected by means of a plurality of rivets 93 having insulating spacer sleeves 94 engaged around the same to hold the two fuse elements properly spaced in parallel relation against rotation with respect to one another. The renewable fuse elements designated as a whole by the reference numeral 92 are of the self aligning type illustrated in connection with Figure 2 and have the end sections thereof tapered and slotted to make said elements self aligning when mounted in position. For the purpose of separating the notched end sections of each pair or group of connected fuse elements metal spacer blocks 95 are loosely engaged on each of the screw bolt ends 90 and have one end squared to seat against the stop block 83 while the inner end is curved and rounded. The spacer blocks 95 are thus adapted to be placed and held in a positive position against rotation so that the same portions of the flat surfaces are always exposed to be contacted by the fuse elements. The inner ends of the spacer blocks 95 are curved and rounded to facilitate the insertion of the fuse element end sections over the sides of the said spacer blocks so that the end sections at each end of a pair of connected fuse element plates are mounted in position and separated by a spacer block 95, the washer 85, and a flanged nut 88.

Figures 33 to 39, inclusive, cover modified types of cartridge fuse removable knife blade type units in which the end terminal blade sections or units are adapted to be connected by means of self aligning renewable fuse elements. In this type of construction no fibre connecting bar, washers and spacer plates are used for connecting and aligning the terminal blades as in the types of fuse units illustrated and described in connection with Figures 1 to 32, inclusive.

Figure 34, which illustrates a fragmentary portion of one end terminal unit, comprises a terminal blade 96 provided with a reduced apertured tongue 97 which has rigidly secured transversely therein the knurled shank of an internally threaded bushing 98 adapted to receive a retaining screw 99 therein. Rigidly secured on the terminal blade 96 and at the junction with the terminal blade tongue 97 are disks 15 and 14 and a thimble closure plate 17 all of which are constructed similar to correspondingly designated parts illustrated in Figures 14, 16, and 18. The end terminal blade tongue 97 is adapted to have engaged thereon a longitudinally notched tapered end section 100 the outer forked end of which is squared at 101 to permit the same to abut against the face of the thimble closure plate 17 to hold a renewable fuse element in proper aligned position with respect to the terminal blade 96 when the retaining screw 99 is tightened.

Figure 33 illustrates a plan view of the modified type of renewable fuse element which comprises intermediate sections 102 the ends of which are tapered. The inner tapered ends of the intermediate sections 102 are connected by means of a reduced middle fuse section 103 which is provided with an oblong opening 104. The outer ends of the intermediate sections 102 are connected to the enlarged tapered inner ends of the forked end sections 100 by means of reduced end fusing sections 105 each of which is provided with an oblong opening 106.

Figure 35 illustrates a knife blade terminal 107 having an apertured reduced tongue 108 integrally formed on the inner end thereof through which is permanently secured a knurled headed screw 109 having removably engaged on the threaded projecting end thereof a flanged nut 110. Mounted on the terminal blade 107 is a thimble closure plate 17 and a lock ring 32 similar to the parts illustrated and described in connection with Figure 15. When the nut 110 is loosened a forked end section 100 of a fuse element is adapted to be engaged on the threaded end of the bolt with the squared end 101 of the fuse section abutting against the plate 17 to hold the fuse element properly aligned with the knife blade terminal 107. The nut 110 may now be tightened to hold the fuse element in its aligned position.

Figure 36 illustrates a fragmentary portion of a fuse element end section 100 connected by means of a screw 99 to a knife blade terminal 111 having a stop plate 112 rigidly secured thereon by means of staking or the like. The squared end 101 of the fuse element end section is adapted to abut against the stop block or plate 112 to hold the fuse element properly aligned with the terminal blade 111 and secured thereto by means of the retaining screw 99 which is threaded into the bushing 98. This arrangement permits renewable fuse elements of a standard length to be used singly, the difference in length being compensated for by providing the terminal blades with intermediate sections of the required length and with the stop blocks against which the squared ends of the renewable fuse elements may be secured in abutting aligned position.

Figure 37 illustrates a terminal blade 113 provided with a reduced intermediate section 114 and a reduced inner end section 115. Secured by means of staking to the intermediate blade section 114 where it joins the inner end section 115 is a stop block 116. Mounted between the terminal blade sections 113 and 114 are a pair of disks 15 and 14 and a thimble closure plate 17. A knurled double screw member 117 is rigidly secured transversely through the inner terminal blade section 115 and has flanged nuts 118 removably engaged on the threaded ends thereof. This mounting is provided for receiving a pair of renewable fuse elements of the type illustrated in Figure 33 with the intermediate sections 102 of the two fuse elements rigidly connected by means of rivets 119 and insulating spacer sleeves 120. The squared forked end of a pair of tapered fuse sections 100 are adapted to be engaged over the projecting threaded ends of the bolt 117 on opposite sides of the terminal section 115 with the squared ends 101 of said fuse sections abutting against the stop plate or block 116 to hold the fuse element in proper alignment with the terminal blade. The flanged nuts 118 may now be tightened to hold the fuse element in its aligned position.

Figures 38 and 39 illustrate a knife blade terminal similar to that illustrated in Figure 37 having mounted thereon a thimble closure plate 17 and a lock ring 32 in addition to a stop block or aligning plate 116. Rigidly secured in an aperture in the terminal plate section 115 is a knurled shank 121 of a double ended screw bolt having threaded sections 122 on the ends of which are removably engaged flanged nuts 123. Loosely engaged on the bolt sections 122 are spacers 124, one end of each of which is squared to abut against the aligning block 116 while the other end is curved and rounded to facilitate mounting of the forked tapered end sections of renewable fuse elements. This type of terminal mounting is provided for a high capacity fuse wherein four or more renewable fuse elements of the type illustrated in Figure 33 are connected in a group by means of rivets 125 and insulating spacer sleeves 126. The high capacity multiple type fuse element is adapted to be mounted as a unit so that four or more of the forked tapered end sections 100 may be engaged on the double ended retaining bolt with the squared ends of the end sections abutting against the aligning plate 116 so that the multiple type renewable fuse unit may be properly mounted in alignment with the terminal blade and secured in said aligned position by means of the nuts 123.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A knife blade type cartridge fuse comprising a fibre casing, thimbles rigidly secured on the ends thereof, notched rings integrally formed on the outer ends of said thimbles with said rings provided with a pair of parallel flanges, a terminal unit removably engaged through said casing, renewable fuse elements mounted in aligned position on said terminal unit, means for removably securing said fuse elements in their aligned positions, notched thimble closure plates secured on said terminal unit and each having a pair of straight parallel edges to permit said closure plates to be removably seated in the notched flanged end rings of said thimbles to hold the terminal unit aligned within said casing against rotation with respect thereto, a pair of disks secured on one end of said terminal unit adjacent one of said thimble closure plates, a disk secured on the other end of said terminal unit, a knurled apertured locking ring adapted to coact with said last mentioned disk to hold the terminal unit locked within said casing, and internally grooved and threaded closure caps engaged over the ends of said terminal unit and threaded onto the thimbles to inclose the disks, plates, and the locking ring secured on said terminal unit.

2. A knife blade type cartridge fuse comprising an insulating casing, threaded thimbles rigidly secured on the ends thereof, notched rings integrally formed on the outer ends of said thimbles, parallel flanges integrally formed on said rings, a removable terminal unit projecting through said casing and the thimbles thereon, a self aligning renewable fuse element on said terminal unit and inclosed by said casing, a locking ring adapted to be removably mounted on one projecting end of said terminal unit to hold the same removably locked in said casing, and retaining caps removably engaged on the outer ends of said thimbles to rigidly assist in holding the terminal unit in aligned position.

3. A knife blade type cartridge fuse comprising an insulating casing, thimbles threaded on the ends thereof, means for rigidly locking said thimbles on said casing, said thimbles having outlet notches provided in the outer ends thereof, oppositely disposed parallel flanges formed in the outer end of each of said thimbles, a removable terminal unit projecting through said casing and the thimbles thereon, notched thimble closure plates secured on said terminal unit and provided with a pair of parallel edges to permit the notched closure plates to seat in the notched outer ends of the thimbles with the straight edges of said terminal plates registering with the thimble flanges to hold the terminal unit aligned within said casing and against rotation with respect thereto, and means for removably locking the aligned terminal unit to said casing.

4. A knife blade type cartridge fuse comprising an insulating casing, notched threaded thimbles rigidly secured on the ends thereof, parallel flanges integrally formed in the outer ends of said thimbles, a removable terminal unit engaged in said casing, renewable self aligning fuse elements on said terminal unit, means for removably securing said fuse elements in proper alignment on said terminal unit, notched closure plates secured on said terminal unit adapted to seat in the ends of said thimbles between the thimble flanges to hold the terminal unit against rotation with respect to said casing, a removable locking member for holding the terminal unit locked against removal from said casing, and internally threaded grooved caps engaged on the projecting ends of said terminal unit and adapted to be threaded onto the outer ends of said thimbles.

5. A knife blade type cartridge fuse comprising a casing, thimbles rigidly secured on the ends thereof, parallel flanges integrally formed on the outer ends of said thimbles, a terminal unit projecting through said casing, self aligning fuse elements removably engaged on said terminal unit to be inclosed by said casing, notched thimble closure plates secured on said terminal unit with said notched closure plates having a pair of straight parallel edges adapted to register with the thimble flanges to hold the terminal unit aligned within said casing and against rotation with respect thereto, and a removable locking member engaged on one projecting end of said terminal unit to hold the terminal unit locked in its aligned position.

6. A knife blade type cartridge fuse comprising a casing, thimbles rigidly secured on the ends thereof, a terminal unit removably engaged in said casing, means on said terminal unit adapted to seat in the ends of said thimbles to hold the terminal unit aligned within said casing and against rotation with respect thereto, and a notched and peripherally grooved locking ring rotatably engaged on one projecting end of said terminal unit adapted to lock said terminal unit in its aligned position.

7. A knife blade type cartridge fuse comprising a casing, thimbles rigidly secured on the ends thereof, a knife blade terminal unit removably engaged in said casing, a self aligning fuse element thereon, means for holding the fuse element secured in its aligned position with respect to the terminal unit, and a notched rotatable locking ring removably engaged on one end of said terminal unit to hold the same locked in a predetermined position with respect to said casing.

8. A knife blade type cartridge fuse comprising an insulating casing, metallic thimbles rigidly secured on the ends thereof, a terminal unit projecting through said casing, a fuse element removably secured thereon and inclosed by said casing, closure plates for said thimbles carried by said terminal unit, a disk secured near one projecting end of said terminal unit to the outside of one of said casing thimbles, and a notched locking member removably engaged on one projecting end of said terminal unit adapted to coact with said disk to removably lock the terminal unit in a predetermined aligned position with respect to said casing.

9. A knife blade type cartridge fuse comprising a casing, notched thimbles rigidly secured on the ends thereof, a pair of parallel flanges integrally formed in the outer ends of each of said thimbles, a terminal unit projecting through said casing, a self aligning fuse element on said terminal unit, means for removably securing said self aligning fuse element in position on said terminal unit, notched closure plates near the ends of said terminal unit adapted to seat in the outer ends of said thimbles and having a pair of straight parallel edges adapted to register with the thimble flanges to hold the terminal unit against rotation within the casing, a stop disk secured on said terminal unit to the outside of one of said thimble closure plates adapted to abut against the outer end of one of said thimbles to limit the insertion of said terminal unit into said casing, a reduced disk rigidly secured on said terminal unit to the outside of the second thimble closure plate, and a notched locking ring removably engaged on one projecting end of the terminal unit and adapted to be engaged over said reduced disk and rotated thereon to removably lock the terminal unit in a predetermined aligned position with respect to said casing.

10. A knife blade type cartridge fuse comprising a casing, radially notched thimbles rigidly secured on the ends of said casing, a terminal unit projecting through said casing, a fuse element removably secured on said terminal unit and disposed within said casing, peripherally notched closure plates rigidly secured on said terminal unit adapted to seat in the outer ends of said thimbles with the peripheral notches of said closure plates registering with the radial notches of said thimbles, and means for removably locking the terminal unit with respect to said casing.

11. A knife blade type cartridge fuse comprising a casing, notched thimbles rigidly secured on the ends thereof, a knife blade type terminal unit removably engaged in said casing, notched closure plates secured on said terminal unit adapted to seat in the notched ends of said thimbles, a stop plate rigidly secured on one end of the terminal unit to limit the insertion of said unit in said casing, a cap closure plate rigidly secured on said terminal unit to the outside of said stop plate, an internally grooved and threaded cap engaged on one projecting end of the terminal unit adapted to be removably engaged over the other end of one of said thimbles to inclose said stop plate and said cap closure plate, a disk rigidly secured on the second projecting end of said terminal unit adjacent the respective thimble closure plate, a knurled notched locking ring removably engaged on the terminal unit and adapted to rotate on said disk to hold the terminal unit locked in a predetermined aligned position with respect to said casing, a second internally threaded and grooved closure cap engaged on the second projecting end of said terminal unit, a slotted closure plate within said last mentioned cap, and means for holding said closure plate associated with said cap, said last mentioned cap adapted to be removably engaged on the second thimble to inclose said locking ring.

12. In a knife blade type cartridge fuse of the class described the combination with a casing, of a notched thimble rigidly secured on one end thereof, a terminal member projecting into said casing, a notched closure plate rigidly secured on said terminal member adapted to be removably seated in the outer end of said thimble, means formed on said thimble and on said closure plate to hold the terminal member against rotation with respect to said casing, a circular disk rigidly secured on said terminal member adjacent the outer side of said closure plate, said disk being of a diameter less than the width of said terminal member, and a knurled notched locking ring adapted to be slidably engaged over said terminal member to rotatably seat on said disk and be rotated with respect thereto to lock the terminal member in position.

13. In a knife blade type cartridge fuse of the class described the combination with a casing, of a notched thimble rigidly secured on one end thereof, a terminal member projecting into said casing, a notched closure plate rigidly secured on said terminal member adapted to be removably seated in the outer end of said thimble, means formed on said thimble and on said closure plate to hold the terminal member against rotation with respect to said casing, a circular disk rigidly secured on said terminal member adjacent the outer side of said closure plate, said disk being of a diameter less than the width of said terminal member, a knurled notched locking ring adapted to be slidably engaged over said terminal member to rotatably seat on said disk and be rotated with respect thereto to lock the terminal member in position, an internally grooved cap removably engaged on said terminal member adapted to engage over the outer end of said thimble to inclose said locking ring, and a closure plate for said cap adapted to be securely pressed against the locking ring when said cap is secured in position.

14. In a knife blade type cartridge fuse of the class described the combination with a casing, of a thimble rigidly secured on the end thereof, a grooved threaded extension integrally formed on the outer end of said thimble, said extension having a plurality of radially directed outlet notches therein, a terminal member projecting into said thimble, a notched closure plate secured on said terminal member adapted to seat in the notched outer end of said thimble to hold the terminal plate against rotation in a predetermined position with respect to said casing thimble, a locking member removably engaged on said terminal member to hold the same locked in place, a cap removably engaged on the projecting end of said terminal member, a closure plate in said cap, and a threaded flange integrally formed within said cap and providing grooves in said cap on opposite sides of said threaded flange, said threaded cap flange adapted to be threaded onto the threaded extension of said thimble to inclose the locking member and the threaded extension of said thimble with one of the grooves in said cap serving to provide a chamber wherein dust or metal particles resulting from the blowing of a fuse may be deposited to obviate clogging up of the threaded portions of the thimble extension and the threaded cap flange.

15. In a knife blade type cartridge fuse of the class described the combination with a thimble, having notches therein, a pair of parallel flanges integrally formed in one end thereof, and a notched closure plate for said thimble constructed with a pair of straight parallel edges adapted to register with the thimble flanges to hold the closure plate in a predetermined position against rotation within one end of said thimble with the notches in said closure plate registering with the notches in said thimble.

16. In a knife blade type cartridge fuse of the class described the combination with a thimble, a notched ring integrally formed on one end thereof, a pair of parallel flanges integrally formed in said ring, and a notched closure plate adapted to seat in said ring and having a pair of straight parallel edges adapted to be positioned to register with said flanges to hold the closure plate in a predetermined position against rotation within said ring with the notches of said closure plate registering with the notches in said ring.

17. The combination with a cartridge fuse notched thimble, of a notched closure plate adapted to be removably seated in one end thereof, and coacting means integrally formed in said thimble and on said closure plate to hold the closure plate in a predetermined position against rotation when seated in said thimble with the notches in said closure plate registering with the notches in said thimble.

18. In a knife blade type cartridge fuse of the class described a terminal unit comprising a terminal blade, a reduced extension integrally formed on one end thereof, a disk secured on said terminal blade, and a peripherally notched plate rigidly secured on said terminal extension to one side of said disk, said plate having a pair of oppositely positioned parallel edges formed thereon.

19. In a knife blade type cartridge fuse of the class described a terminal unit comprising a terminal blade having a reduced integral extension on one end thereof, a pair of disks rigidly secured on said terminal blade, a notched plate secured on said terminal blade extension adjacent one of said plates and having a pair of straight parallel edges, a cap engaged on said terminal blade adapted to be positioned to inclose said disks and plate, and means integrally formed on one end of said terminal blade to hold the cap in associated relation with said terminal blade.

20. The combination with a knife blade type cartridge fuse, of a terminal unit comprising a pair of terminal blades having reduced end sections, screw means mounted on said reduced end sections, a notched renewable fuse element engaging said screw means and connecting said reduced terminal end sections, mounting disks on said terminal blades, and aligning members spaced from said disks and rigidly secured on said terminal blades between said disks and screw means to facilitate alignment of said terminal blades and said renewable fuse element.

21. In a knife blade type cartridge fuse of the class described a terminal unit comprising a terminal blade, a reduced apertured extension integrally formed thereon, a notched aligning plate rigidly secured on said terminal extension, a disk secured on said terminal extension between the aligning plate and said terminal blade, a locking ring having a pair of oppositely disposed notches formed in the inner peripheral edge thereof to permit the ring to be slidably engaged over said terminal blade to permit the locking ring to be rotatably seated on said disk, said locking ring having the outer peripheral edge thereof knurled and provided with edge grooves.

22. The combination with a cartridge fuse, of a flanged closure cap open at both ends, a threaded flange integrally formed within said cap forming inner peripheral grooves therein, a closure plate loosely mounted within said cap within one of said grooves, and headed rivets rigidly secured to said closure plate and projecting through one end of said cap with the heads of said rivets coacting with the flange of the closure cap to hold the closure plate associated with said cap.

23. The combination with a knife blade type cartridge fuse, of a terminal unit comprising a terminal blade having a pair of integrally reduced sections formed thereon, an aligning block rigidly secured on said terminal blade at the junction of the reduced sections, a screw member rigidly secured to and projecting through one of said reduced sections, said screw member having a portion thereof knurled to prevent rotation of the screw member when mounted in place, rounded spacers loosely engaged on said screw member on opposite sides of said terminal blade extensions, said spacers having one end thereof squared to abut against said aligning block, and flanged nuts adjustably engaged on said screw member to the outside of said spacers.

24. A knife blade type cartridge fuse comprising a casing, thimbles rigidly secured thereon, a fuse element carrying terminal unit projecting through said casing, grooved caps for engagement on the ends of said thimbles for holding the terminal unit secured in place, and locking means engaged on said terminal unit for locking said terminal unit in said casing independently of said caps.

25. The combination with a cartridge fuse casing, of a removable terminal unit projecting therethrough, a stop member on one end of said terminal unit for limiting the insertion of said terminal unit in said casing, and a lock member removably and rotatably engaged on the opposite end of said terminal member adapted to hold the same locked in a predetermined position within said casing.

26. A knife blade type cartridge fuse comprising a casing, notched thimbles rigidly secured on the ends thereof, notched closure plates for said thimbles adapted to be seated in said thimbles with the notches thereof registering with the notches in said thimble to afford outlets for the products resulting from the blowing of a fuse element within said casing, and grooved caps engaged on the ends of said terminal unit and removably engaged on said thimbles with the grooves in said caps affording chambers facilitating the depositing of the products resulting from the blowing of the fuse after said products have escaped through the registering notches of said thimbles and closure plates.

27. In a knife blade type cartridge fuse of the class described, a terminal unit comprising a pair of knife blades, an insulation element connecting said blades, fuse elements mounted on said blades adjacent said insulation element, a notched closure plate on one of said blades, a disk on said blade adjacent said closure plate and having lugs struck therefrom, a notched closure plate on the other of said blades, a reduced disk on said second blade adjacent the closure plate thereon, and a notched locking ring adapted to be slidably engaged over said second mentioned blade and rotatably engaged around the reduced disk.

28. A fuse-element and fuse-element-holder assembly for electric fuses comprising a rigid fiber bar; a fuse element spaced therefrom, means for rigidly securing said parts together in such relation, and knife blade terminals rigidly connected to the ends of said holder by said securing means, said securing means and knife blade terminals being provided with cooperating surfaces for preventing relative pivotal movement between the parts.

29. In a renewable fuse, the combination of a casing, contact terminals projecting into the casing at opposite ends thereof, the inner ends of the said terminals having transverse apertures therethrough, means at the respective ends of the casing for closing the said ends and for holding the terminals in place, two similar connecting members extending transversely through the apertures in the respective terminals and positively held in fixed relation thereto, clamping elements normally engaging the respective connecting members and adapted to releasably hold a fuse link with its ends in electrical connection with the respective terminals at one side thereof, the said elements being releasable while the said connecting members remain in the said positively held fixed relation to the terminals and a longitudinal non-conducting strut located inside the casing at the opposite side of the terminals and so engaged by the said connecting members that the terminals are held against relative longitudinal movement and are also held against angular movement relatively to the strut or relatively to each other.

30. In a renewable fuse, the combination of a casing, contact terminals projecting into the casing at opposite ends thereof, the inner ends of the said terminals having transverse apertures therethrough, means at the respective ends of the casing for closing the said ends and for holding the terminals in place, two similar connecting members extending transversely through the apertures in the respective terminals and positively held in fixed relation thereto, clamping elements normally engaging the respective connecting members and adapted to releasably hold a fuse link with its ends in electrical connection with the respective terminals at one side thereof, a longitudinal non-conducting strut inside the casing at the opposite side of the terminals, the said strut being so engaged by the said connecting members that the terminals are held against relative longitudinal movement, and spacing means associated with the respective connecting members for holding the strut at a predetermined distance from the terminals.

31. In a renewable fuse, the combination of a casing, contact terminals projecting into the casing at the opposite ends thereof, the inner ends of the said terminals having transverse apertures therethrough, means at the respective ends of the casing for closing the said ends and for holding the terminals in place, two similar connecting members extending transversely through the apertures in the respective terminals, the said apertures and the corresponding portions of the connecting members being non-circular so that relative turning is prevented, clamping elements normally engaging the respective connecting members and adapted to releasably hold a fuse link with its ends in electrical connection with the respective terminals at one side thereof, a longitudinal non-conducting strut inside the casing at the opposite side of the terminals, the said strut having apertures therein near its ends for receiving the respective connecting members and thereby holding the terminals against relative longitudinal movement, the said apertures in the strut and the corresponding portions of the connecting members being non-circular so that relative turning is prevented.

32. A knife blade type cartridge fuse comprising a casing, a terminal unit removably engaged in said casing, means on the terminal unit adapted to interfit with the ends of the casing to hold the terminal unit aligned within said casing and against rotation with respect thereto, and a notched and peripherally grooved locking ring rotatably engaged on one end of said terminal unit for locking the same in an aligned position with respect to said casing.

33. A knife blade type cartridge fuse comprising a casing, a fuse element carrying terminal unit projecting through said casing, caps engaged on the ends of said casing for holding the terminal unit secured in place, and locking means engaged on the terminal unit for locking the same in said casing independently of said caps.

34. As an article of manufacture a pair of spaced terminals, a bridge member therebetween and aligned therewith with the ends of said bridge member abutting the inner ends of said terminals, and plates secured on the sides of the bridge member and projecting beyond the ends thereof to overlap the inner ends of said terminals.

35. As an article of manufacture a pair of terminals, a bridge member therebetween and disposed in the plane of said terminals, said bridge member having forked ends for receiving the inner ends of the terminals to hold the bridge member secured in aligned relation with said terminals.

36. As an article of manufacture a replaceable fuse element structure comprising spaced terminals, a bridge member disposed therebetween, plates bridging the inner ends of said terminals and said bridge member to hold the same aligned in the same plane, fuse elements connected to the terminals, and spacers rigidly secured on said plates for holding the fuse elements in spaced relation therewith.

37. As an article of manufacture a replaceable fuse element structure comprising spaced terminals, a bridge member therebetween, plates overlapping the inner ends of said terminals and said bridge member for holding the bridge member disposed in the plane of said terminals, and stop members secured on said terminals against which the outer ends of said plates abut to hold the fuse element parts against pivotal or swinging movement with respect to one another.

38. As an article of manufacture a replaceable fuse element structure comprising spaced terminals, a bridge member therebetween, plates overlapping the inner ends of said terminals and said bridge member for holding the bridge member disposed in the plane of said terminals, stop members secured on said terminals against which the outer ends of said plates abut, spacing disks rigidly secured on said plates, a plurality of fuse elements, and means for securing the fuse elements in place in contact with said spacing disks to hold the fuse elements spaced from said plates and from said bridge member.

39. In a renewable fuse element structure the combination with spaced terminals, of bridge means having the ends thereof forked for receiving the inner ends of said terminals for holding the bridge means aligned with said terminals centrally of the fuse element structure.

40. In a renewable fuse element structure, spaced terminals, stop members secured thereon, a bridge member disposed therebetween, spaced plates secured on the ends of said bridge member and overlapping the inner ends of said terminals to abut against the stop members to hold the bridge member aligned with the terminals centrally of the fuse element structure, spacers rigidly secured on said plates, and fuse elements connected between said terminals and in contact with said spacers.

41. The combination with a fuse unit comprising terminal members and a fuse strip, of means for mounting the fuse strip on the terminal members, said means comprising bolts having nuts engaged thereon, each nut constructed of a plurality of pieces of metal.

42. In a knife blade type cartridge fuse of the class described, a terminal unit comprising a pair of terminal blades, screw means mounted thereon, a fuse element engaged on said screw means, and nut members engaged on said screw means for holding the screw elements in place, each of said nut members constructed of two pieces of metal.

JOHN B. GLOWACKI.